Dec. 10, 1968   A. M. STEVENS   3,415,964
ELECTRICAL SWITCH
Filed Oct. 22, 1965
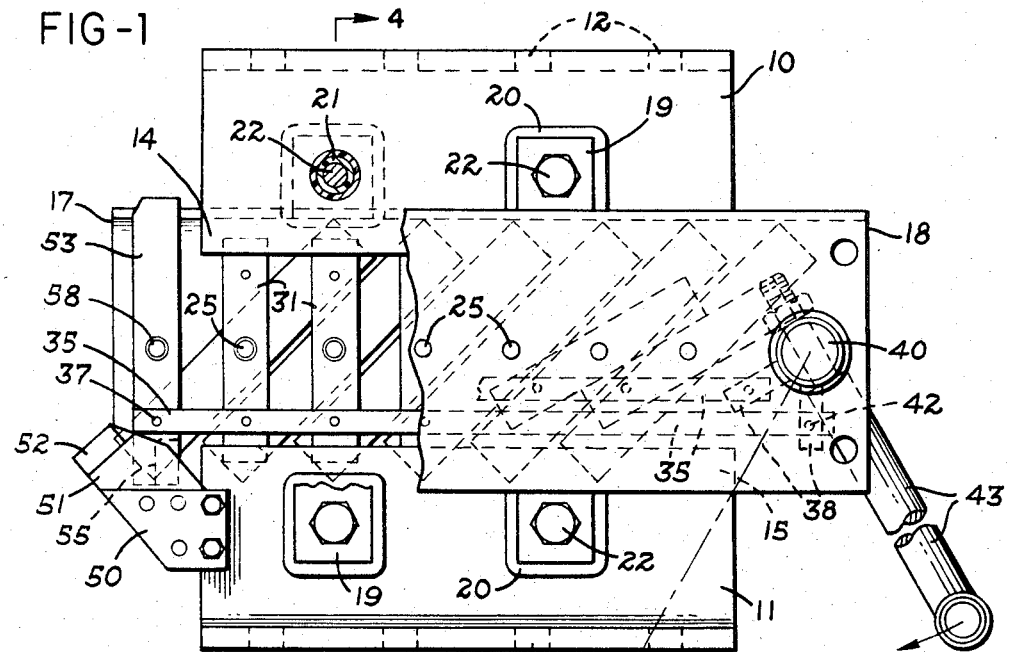
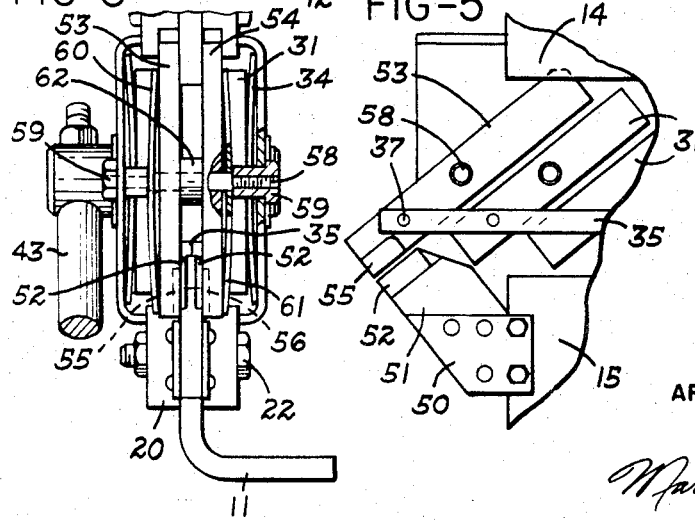
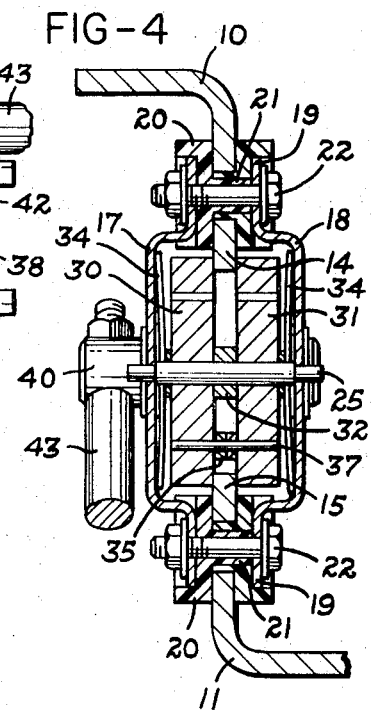
INVENTOR.
ARTHUR MYRON STEVENS
BY
*Marechal, Biebel, French & Bugg*
ATTORNEYS

United States Patent Office

3,415,964
Patented Dec. 10, 1968

3,415,964
ELECTRICAL SWITCH
Arthur Myron Stevens, Middletown, Ohio, assignor, by mesne assignments, to Square D Company, a corporation of Michigan
Filed Oct. 22, 1965, Ser. No. 501,491
5 Claims. (Cl. 200—146)

ABSTRACT OF THE DISCLOSURE

A low-voltage, high-current switch having a row of centrally pivoted pairs of contact bars which are rockable in unison so that their opposite ends selectively engage with and disengage from spaced terminal plates. A pivoted pair of arcing contact bars at one end of the row rocks with the other contact bars and, when the other contact bars are in engagement with the plates, engages an arcing contact on one of the plates but is disengaged from the other plate. The arcing contact bars are so proportioned and positioned that, during disengagement of the other contact bars, the pair of arcing contact bars engages the one plate and then disengages from the arcing contact after the other pairs of contact bars have disengaged from the terminal plates.

---

This invention relates to an improved electrical switch device, particularly a switch adapted for use in electrical circuits having relatively high current and relatively low voltage power requirements.

A switch according to the present invention has particular utility in electrical circuits for short-circuiting or bypassing electrolytic cells, or used to isolate high current, low voltage electric power equipment, or for reversing the polarity of connections to such electric devices.

In the electrochemical process industry and in the electrolytic reduction of aluminum there is a requirement for an electrical switch device to bypass or shunt the normal electric current out of and around an electrolytic process cell. With the current flowing around the cell rather than through it a cell can be safely drained of electrolyte and otherwise serviced without interrupting the flow of power through other cells connected in series with it. In certain instances, the bypass switch must be closed very quickly to avoid damage to the cell or even possible explosion. Prior art switches for applications of this type have been termed cell-shorting switches, or they are sometimes called merely "cell switch." In this application the switch is usually mounted directly on the electrolytic cell, and need not be insulated from ground. Voltage across the switch when it is open is only the back E.M.F. of the electrolyte in the cell plus the resistance drop of the electrolyte and the associated anode and bus connections, in most instances less than ten volts.

In the use of high power conversion equipment such as semi-conductor rectifiers there is a requirement for a compact, high current disconnecting switch to provide a means of isolating the rectifier from the heavy direct current bus running to the load and to the other parallel conversion equipment. It is frequently desirable to have a compact switch device which can be mounted inside the rectifier cubicle and inserted in the heavy bus bar leads without significantly distorting the bus bar configuration.

In the electroplating industry, there is a requirement for an electrical switch device to perform the function of reversing the polarity of the direct current voltage applied to the terminals of the plating tank. Such a switch must be relatively compact and have a high current carrying capacity, but needs only withstand less than ten volts direct current in the open position.

The improved electrical switch device of this invention includes a device to protect the switch elements from arcing which occurs when the switch is disconnected while under high current loads. By protecting the main switch contacts from arcing, the life of the switch can be materially increased and higher current carrying ability can be maintained throughout the life expectancy of the switch.

The addition of an auxiliary electrode, constructed of special arc resistant elements, to the basic high-current cell switch described in copending application Ser. No. 325,250 causes most of the arcing to take place on the auxiliary switch contacts rather than on the main switch contacts. These auxiliary contacts are especially arc resistant and are constructed and positioned so as to be easily replaceable when contact deterioration has proceeded beyond an acceptable level.

The present invention provides a novel switch device including an arc prevention device for main contact switches applicable to the above listed and other uses, as will be apparent to those skilled in the art.

Accordingly, the primary object of the present invention is to provide a novel electrical switch including an arc prevention means for controlling electrical circuits which is capable of relatively high current flow, for example, in the order of several thousand amperes and a relatively low voltage, such as less than 600 volts, and in many cases less than ten volts.

Another object of this invention is to provide an improved electrical switch device of this nature which is of compact and economical construction but which includes contact protection means which result in long life and minimum maintenance and which is less susceptible to maladjustment or mechanical failure than switching devices presently available for this type of service.

An additional object of this invention is to provide in such a switch a novel arc diverting construction whereby, during operation of the switch, a parallel electrical path is provided between the stationary contacts which includes a movable arc contact member to complete the circuit during switch closure before the main switch contacts and during switch opening to break the circuit after the main contact is opened, thereby localizing arcing or sparking to the locale of the movable contacts in such parallel path.

These and other objects and advantages of the invention will be apparent from the following description, the accompanying drawings and the appended claims.

In the drawings:

FIG. 1 is a plan view with some parts broken away and shown in section, of a typical device constructed in accordance with this invention;

FIG. 2 is a side view and partial section, with some parts broken to shorten the illustration, as viewed for example from the top of FIG. 1;

FIG. 3 is an end view showing a portion of the switch as viewed looking from the left of FIG. 1 with some parts broken away and shown in section;

FIG. 4 is a sectional view taken along lines 4—4 in FIG. 1; and

FIG. 5 is a detail view of a portion of the switch element shown during opening with the main contacts open while the arcing contacts are still engaged.

Referring to the drawings, which illustrate preferred embodiments of the invention, and particularly with reference to FIG. 1, the terminal tangs and stationary contacts of the switch are provided by a pair of plates 10 and 11. Each of these have a number of elongated holes or slots 12 through which bolts or the like can be inserted to secure the terminals to bus bars or the like. The terminal plates 10 and 11 are supported in fixed spaced relation such that the contact portions 14 and 15 thereof are spaced apart a predetermined distance. The structure for so mounting and connecting the terminals includes a pair of complementary cover plates 17 and 18 which may be stamped from metal or otherwise formed to the desired shape as shown in FIG. 4. Each of these plates is provided with outwardly extending ears 19, and between these ears of the covers there are insulator blocks 20, including telescoping bushing parts 21 (FIG. 4) which isolate the terminals electrically from the covers. These parts are clamped together by a plurality of bolt and nut fasteners 22 which extend through appropriate holes in the covers, the blocks 20, and the terminal plates 10 and 11. Each bolt is thus surrounded by an insulation in order to insulate the covers completely from the terminals.

A plurality of dowels or pins 25 extend through the covers and traverse the space between the terminals. On these dowels there are mounted pairs of movable main contact or switch bars which are identified by the reference numerals 30 and 31, and which are separated by a suitable spacer 32 having a thickness less than the thickness of the contact portions 14 and 15. There may be as many pairs of these contact bars as desired, depending upon the length of the terminals and the width of the individual contact bars. In the illustrated example there are six pairs of contact bars. On the outside of each contact bar, in other words between the bar and the adjacent cover plate, there is a leaf spring 34 which acts between the cover and the center of the contact bar tending to move the bar inwardly of the dowel. This relationship is best seen in FIGS. 3 and 4.

Thus, with the contact bars overlapping the terminal contact portions 14 and 15, as shown in FIGS. 1, 3 and 4, these springs tend to promote face to face contact, over a substantial area, between the contact bars and the terminals. In addition, during opening and closing movement of the contact bars the pressure applied by the springs 34 has the desirable effect of causing the movable contacts to wipe over the stationary terminal portions and thus to tend to clean the mating switch surfaces of corrosion and any foreign matter. This promotes a low resistance, intimate contact between the movable and stationary contacts of the switch.

The motion of the movable contact bars can best be understood by reference to FIG. 1 where the pairs of main contact bars are shown in closed position. A push rod 35 is pivotally attached to each pair of movable contact bars by a pin 37 (FIG. 4) which extends through the push rod and into suitable bores formed in the contact bars. Thus, longitudinal motion of push rod 35 will cause simultaneous swinging or pivoting motion of the movable contact bars between the closed position shown in full lines and the open position shown in dotted lines in FIG. 1. In the open position the pairs of contact bars 30, 31 each swing to extend at an angle across the space between the terminal contacts 14 and 15. The contact bars are clear of both terminal contacts as shown, thus effectively isolating the movable contact bars and all parts connected thereto from any electrical circuit.

Opening and closing movement is derived from the crank 38 which extends from a crank shaft 40 pivotally mounted in the cover plates 17 and 18 at one end of the switch assembly. The crank 38 has a pivotal connection to push rod 35 by means of a connecting pin or dowel 42. A handle 43 is fastened to the crank shaft 40 and provides for manual opening and closing of the switch. Any other convenient arrangement may be used for providing the opening and closing power. For example, the arm 43 may be connected to a remotely controlled pneumatic cylinder or any other suitable motor device.

Even though, under low voltage conditions, there is a relatively short duration of arcing at the switch contacts when the switch is opened, especially if the contacts are opened fairly rapidly, as would normally be the case, it is desirable to provide an arc controlling arrangement to eliminate any arcing at the main contact bars. For this purpose, an auxiliary set of contacts is provided which forms a parallel electrical path and which completes the circuit during switch closure before the main contact bars close and which breaks the circuit during switch opening after the main contact bars are separated from the main contact portion of the switch.

Secured to the lower stationary terminal plate 11 is the auxiliary terminal assembly 50 which consists of a mounting bracket and stationary copper terminal 51 having an arc resistant contact portion 52 which extends above the contact portion 15 of terminal plate 11. This contact portion 52 may be formed from any of the arc resistant elements and in one embodiment of the switch constructed according to this invention the contact portion formed from a silver tungsten alloy. The arc resistant contact portion of the stationary copper terminal 51 can be seen, especially in FIGS. 2 and 3, to extend into the copper terminal for about one quarter of its thickness on each side. This arc resistant inlay may be secured to the terminal 51 by silver soldering.

A pair of auxiliary switch bars 53 and 54 are mounted between cover plates 17 and 18. The lower end portions 55 and 56 of these auxiliary bars are also provided with an arc resistant tip formed from a silver tungsten alloy which is silver soldered in place. These auxiliary bars are rotatably mounted between cover plates 17 and 18 by a pin 58. A pair of cap nuts 59 extends through the cover plates 17 and 18 and each is threaded onto an end of the pin 58.

A pair of stainless steel leaf springs 60 and 61 resiliently urge the auxiliary bars 53 and 54 against the contact portion 14 and against stationary terminal 51. The center of these springs passes over the pin 58 and abuts the shoulder formed by the cap nuts 59 assuring that positive pressure will be maintained against the switch bars 53 and 54 even though these bars are mounted at an extreme end of the cover plates 17 and 18. Relative movement between the spring and its associated contact bar is prevented by allowing a portion of pin 37, which connects the switch bars 53 and 54 with push rod 35, to extend through a hole (not shown) in each of the springs 60 and 61. A spacer 62 separates the auxiliary contacts by an amount slightly less than the thickness of the stationary contacts allowing the springs to urge the auxiliary contact bars into positive relationship with the stationary contact but also maintaining separation of the auxiliary contacts during periods when the switch is open. Thus, these springs aid in providing the necessary contact pressure required to give a low resistance contact and tend to clean the mating surface of corrosion during opening and closing of the switch.

Rotation of the handle 43 will cause both the main contact bars 30 and 31 to rotate as well as the auxiliary contact bars 53 and 54. After partial rotation, but before the main contacts start to open, the top portion of the auxiliary bars 53 and 54 engage the contact portion 14 of the upper terminal plate 10 while the lower portion of the movable auxiliary contacts 55 and 56 remain in engagement with the stationary terminal 51. Continued rotation of the handle 43 will cause the main contacts 30 and 31 to disengage the contact portions 14 and 15. Arcing at this time is prevented at the main switch contacts through the parallel electrical path provided by the arc contacts 53 and 54.

As best shown in FIG. 5, further rotation of the handle 43 will cause the lower portion of the movable auxiliary bars to disengage the stationary copper terminal 51 while remaining engaged with the upper contact portion 14. Arcing thus occurs only between the arc resistant or silver tungsten tips on the lower portion of the movable contact bars 55 and 56 and the silver tungsten tip 52 of the stationary terminal 51. Continued rotation of the handle 43 to the fully open position causes the auxiliary switch bars to extend diagonally across the space between the contact portions and out of contact therewith.

Since arcing is confined to the special arc resistant contacts, switch life is considerably increased. With arcing confined to these additional auxiliary components, replacement of these components is readily made when they eventually become eroded without requiring disassembly of the remainder of the switch. Merely removing the cap nuts 59 will allow replacement of the contact bars 53 and 54 while the stationary auxiliary terminal 50 can be replaced without disturbing the other components.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an improved electrical switch adapted particularly for use in low-voltage, high-current applications and including a pair of terminal plates lying in a common plane and mounted with respective straight edges thereof in parallel-spaced relation forming a pair of spaced-apart stationary contact areas, support means positioned on opposite sides of the space between the contact areas and in electrically insulated relation to the terminal plates, a plurality of pivot pins carried by the support means and extending transversely through said space substantially normal to the plane of the plates and generally midway between the contact areas to form a row of switch pivots, pairs of spaced-apart contact bars pivotally mounted on said pins, respectively, spacer means between the bars of each pair, biasing means acting upon the bars of each pair urging the bars of each pair toward each other and their associated spacer means, the spacing of the end portions of the contact bars of each pair being no greater than the thickness of the terminal plates at the contact areas during engagement of the bars with the contact areas, and operating means connecting all of the pairs of bars for concurrent pivoting movement thereof between an open position wherein the bars are disengaged from the contact areas and a closed position wherein the ends of each pair of contact bars respectively overlap the contact areas to form a plurality of parallel conductive paths of low resistance between the contact areas, the improvement comprising means electrically connected to one of the plates to provide an arcing contact area, an additional pivot pin in the row, a pair of auxiliary contact bars pivoted on the additional pivot pin and connected to the operating means for concurrent pivoting movement with the other contact bars, spacer means between the pair of auxiliary contact bars, and biasing means acting upon the auxiliary contact bars urging them toward each other and their spacer means, the spacing of the auxiliary contact bars at one end being no greater than the thickness of said contact areas and at the other end no greater than the thickness of the arcing contact area, the auxiliary contact bars being so proportioned and the additional pivot pin and the arcing contact area connected to said one of the plates being so positioned that, during pivoting movement of the bars from said closed to said open position, the auxiliary pair of contact bars is engaged with the contact area of the other of said plates at said one end and with the arcing contact area at said other end and remains so engaged until after the other switch bars have separated from the contact areas, whereupon said other end of the auxiliary contact bars separates from the arcing contact area while said one end of the auxiliary contact bars remains engaged with the contact area of said other plate.

2. A switch as claimed in claim 1 wherein the contact area of said other of said plates is so positioned that said one end of the pair of auxiliary contact bars is disengaged from said other contact area in said closed position and engages said other contact area during pivoting movement of the contact bars from said closed to said open position.

3. A switch as claimed in claim 2 wherein said additional pivot pin is at the end of the row and beyond an end of said other contact area, and said contact bars are substantially normal to said straight edges of said terminal plates in said closed position, whereby said one end of the auxiliary contact bars is disengaged from said other contact area in said closed position.

4. A switch as claimed in claim 1 wherein said arcing contact area is formed from arc-resistant contact material.

5. A switch as claimed in claim 4 wherein contact areas are at said other end of said auxiliary switch bars and are formed from arc-resistant contact material.

References Cited

UNITED STATES PATENTS

| | | | |
|---|---|---|---|
| 570,418 | 10/1896 | Wurts | 200—146 |
| 706,581 | 8/1902 | Merrick | 200—146 |
| 1,901,449 | 3/1933 | Hoge | 200—146 |
| 1,901,573 | 3/1933 | Wilms | 200—146 |
| 2,100,753 | 11/1937 | Schofield et al. | |
| 2,443,230 | 6/1948 | De Coursey | 200—146 |
| 3,236,981 | 2/1966 | Fallows. | |
| 3,345,485 | 11/1967 | Engel | 200—146 |

ROBERT S. MACON, *Primary Examiner.*